United States Patent [19]

Anderson et al.

[11] 3,835,442

[45] Sept. 10, 1974

[54] TERMINATION MODULE UTILIZING CONDUCTIVE ELASTOMER BUSSING

[75] Inventors: Norman R. Anderson, Cicero; Joseph Janatka, La Grange, both of Ill.

[73] Assignee: Bunker Ramo Corporation, Oak Brook, Ill.

[22] Filed: Feb. 1, 1973

[21] Appl. No.: 328,705

[52] U.S. Cl. ............ 339/59 R, 339/207, 339/217 S, 339/242, 174/68.5, 339/198 R

[51] Int. Cl. ............................................ H01r 11/02

[58] Field of Search ..... 339/22 B, 242, 17 M, 18 C, 339/59, 60, 61, 19, 198, 217, 207; 174/68.5; 200/166 C

[56] References Cited

UNITED STATES PATENTS

| | | | |
|---|---|---|---|
| 3,329,851 | 7/1967 | Braeutigam et al. | 313/108 |
| 3,509,296 | 4/1970 | Harshman et al. | 339/17 R X |
| 3,648,002 | 3/1972 | Durocher | 200/166 C |
| 3,680,037 | 7/1972 | Nellis et al. | 339/61 M |
| 3,725,852 | 4/1973 | Blanchet | 339/198 |
| 3,743,890 | 7/1973 | Neu | 317/101 CP |

*Primary Examiner*—Bobby R. Gay
*Assistant Examiner*—Robert R. Hafer
*Attorney, Agent, or Firm*—F. M. Arbuckle; W. Lohff; N. Lesser

[57] ABSTRACT

This invention relates to a termination module for selectively interconnecting a plurality of electrical conductors. The conductors to be connected are attached to pin contacts mounted in a housing, the pin contacts having a contacting surface at one end. A bus pad of a conductive elastomer material is supported in intimate physical and electrical connection with the contacting surfaces of the contact pins for at least two of the conductors which are to be joined. A bus bar of copper or some other metallic material may be supported adjacent the side of the bus pad opposite the side in contact with the contact pins to shunt at least some of the current flowing between the pins, thereby reducing the resistance of the termination. Where a requirement exists that a circuit not be completed through the bus pad until the contact pins are substantially mounted, the bus pad may be formed of a conductive elastomer which is conductive only when a compressive force is applied thereto.

6 Claims, 7 Drawing Figures

TERMINATION MODULE UTILIZING CONDUCTIVE ELASTOMER BUSSING

This invention relates to termination modules of the type utilized for selectively interconnecting a plurality of electrical conductors and, more particularly, to a termination module of the type indicated which utilizes pads of conductive elastomer material for bussing the conductors.

BACKGROUND OF THE INVENTION

Termination modules may be utilized for connecting power lines to a feeder line and for other applications where electrical conductors are to be interconnected. Normally, the conductors to be interconnected by such a module are either conducting or are adapted to conduct high currents.

Existing termination modules have generally attached a metal cap or contact pin to the end of each of the conductors to be interconnected and utilized a copper bus bar in contact with the tip of each of the caps or contacts to shunt the conductors.

With this arrangement, the current density, and thus the resistance, at the metal-to-metal contact points is relatively high. This is because the nature of the metals is such that actual physical and electrical contact is made at only a few minute points rather than over the entire end surface area of the cap or pin. It is apparent that this poor metal-to-metal joint, in addition to increasing the resistance of the termination, also creates hotspots and potential arcing at the junction which can cause pitting, and burn-out both of the contact and the bus, reducing the useful life of these elements, and further increasing the resistance of the termination.

Another problem arises when one of the lines to be connected by the termination is a live or hot-line. Particularly if there is a high voltage on this line, arcing and burn-out may occur as the contact approaches the bus and before the two are in good physical and electrical contact. This is because the bus is an excellent electrical conductor, permitting an electrical circuit to be established through it as soon as the contact closely approaches or makes even the slightest contact with the bus. It is thus apparent that it would be preferable if the module could be designed so that an electrical circuit was not established through the bus until complete physical and electrical contact has been established between the conductor contact and the bus bar.

SUMMARY OF THE INVENTION

In accordance with the above, this invention provides a termination module for selectively interconnecting a plurality of electrical conductors. The module includes a contact housing having a plurality of adjacent contact-receiving openings. There is a pin contact for at least each of the electrical conductors which are to be interconnected, each of the pin contacts being electrically connected to the corresponding electrical conductor at one end and having a contacting surface at its other end. Each of the pin contacts also has an element adapted to coact with a corresponding element in each of the openings to retain the contact in the opening. The module also has at least one bus pad of a conductive elastomer material and a means for supporting the bus pad in intimate physical and electrical contact with the contacting surfaces of the contact pins for at least two of the conductors which are to be joined. A bus bar of copper or some other metallic material may be supported adjacent the side of the bus pad opposite the side in contact with the contact pins to shunt at least some of the current flowing between the pins, thereby reducing the resistance of the termination. Where a requirement exists that a circuit not be completed through the bus pad until the contact pins are substantially mounted, the bus pad may be formed of a conductive elastomer which is conductive only when a compressive force is applied thereto.

The foregoing and other objects, features and advantages of the invention will be apparent from the following more particular description of preferred embodiments of the invention as illustrated in the accompanying drawings.

BRIEF DESCRIPTION OF DRAWINGS

The same reference numerals will be utilized to designate common elements in the various embodiments of the invention shown in the figures.

DETAILED DESCRIPTION

Figure 1:
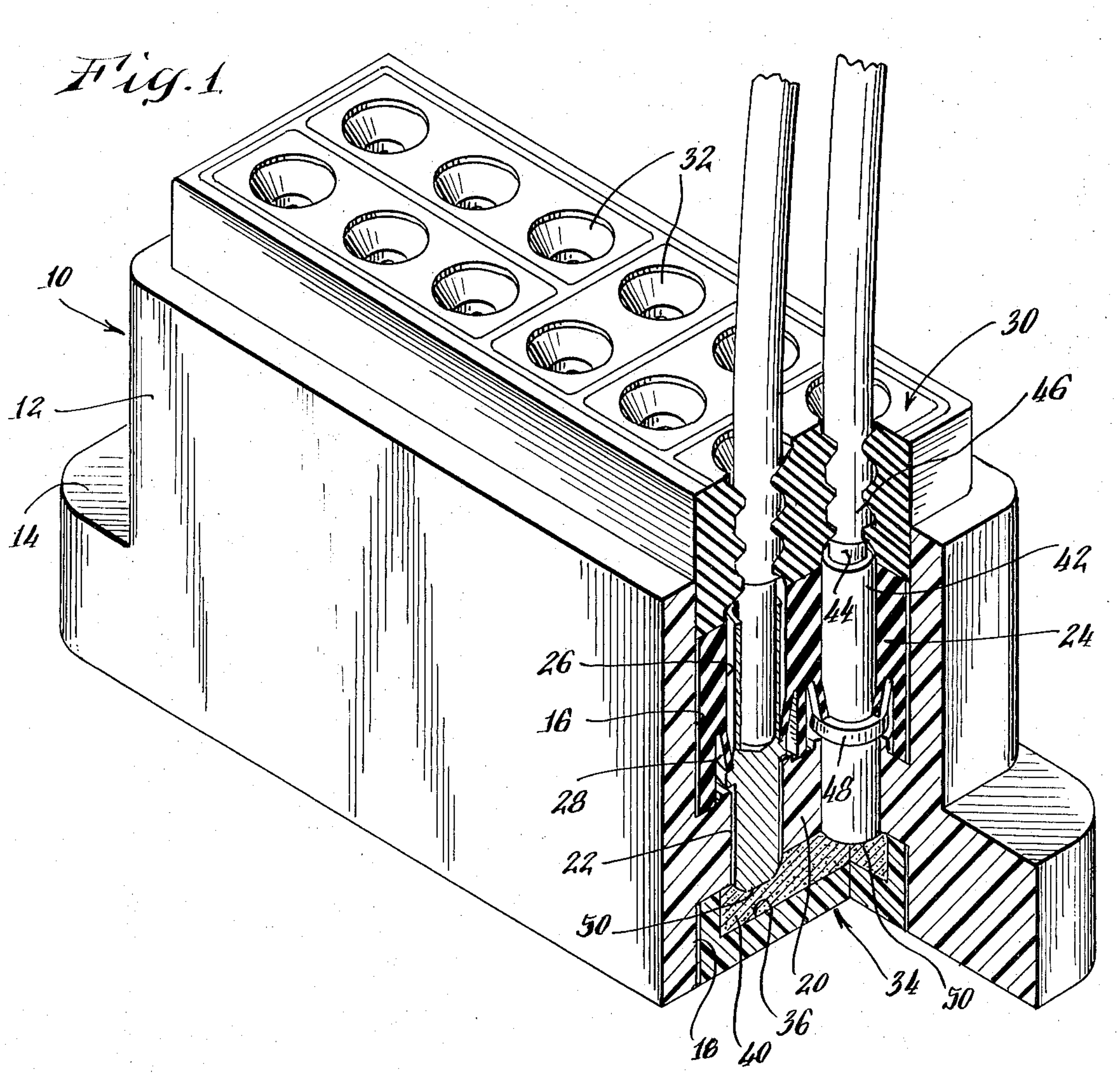
FIG. 1 is a partially cut-away perspective view of a termination module of a first embodiment of the invention.
Figure 2:
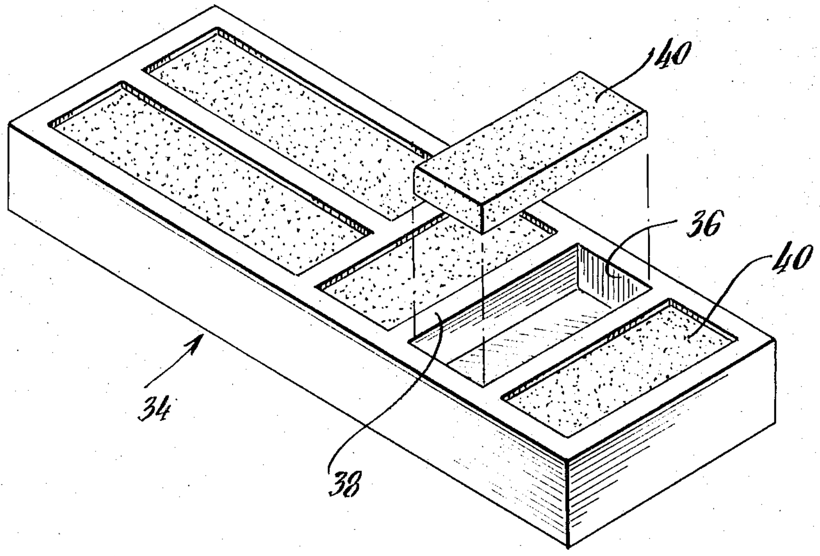
FIG. 2 is a partially exploded perspective view of a bus housing suitable for use with the embodiment shown in FIG. 1.

Referring now to FIGS. 1 and 2, it is seen that the termination module 10 for the first embodiment of the invention consists of an outer body 12 formed of a plastic or other insulating material which body has a mounting flange 14 formed at each end, an upper cavity 16, and a lower cavity 18. The wall 20 between cavities 16 and 18 has a plurality of openings 22 forming therethrough. The functions of opening 22 will be described later.

A contact retention insert or housing 24 is mounted in cavity 16. Insert 24 has a plurality of openings 26 formed therethrough each of which terminates at its lower end in a pair of resiliant retention tines 28 which tines are formed as part of the insert. A sealing grommet 30 is mounted on top of insert 24. Grommet 30 rests partly within cavity 16 and extends partly above the cavity.

Grommet 30 has a plurality of openings 32 formed therein. Openings 22, 26 and 32 correspond to each other in number and are aligned.

A supporting means or bus housing 34 is fitted in lower cavity 18. Referring to FIG. 2, which shows the housing in greater detail, it is seen that the supporting means or housing 34 has a plurality of bus-receiving slots 36 formed therein, the slots being physically separated and electrically insulated from each other by walls 38 of the housing. A bus pad 40 is mounted in each of the slots 36. Each bus pad is of a conductive elastomer material and may, for example, be cut to the desired shape from a piece of sheet stock. The material for pad 40 may be standard conductive silicone or fluoro silicone elastomers impregnated with a conductor such as silver, which conductive elastomers are always conductive, or, for reasons to be discussed in greater detail shortly, the conductive elastomer material may be of a type which is conductive only when compressed, i.e., when pressure is applied thereto. Pressex, manufactured by Essex International, is an example of the latter type of conductive elastomers.

Contact housing 24, bus housing 34 and grommet 30 are all formed of plastic, rubber or other suitable insulating material. The housing and grommet may be secured in body 12 by frictional pressure, suitable adhesives, or other techniques known in the art.

A contact pin 42, connected at one end to an electrically conducting respective wire 44 covered by an insulation 46, may be passed through an opening 32 in grommet 30 and by use of a standard rear release or other tool, positioned in the corresponding or respective contact pin receiving opening 26 of insert 24 and opening 22 of wall 20. The contact has a first retaining element or ridge 48 with a tapered leading edge which ridge is engaged by a second retaining element of electrically insulating material or tines 28 when the contact pin is fully inserted in the module with its other or forward contacting surface end 50 spaced longitudinally from one end of the respective opening 22 and projecting slightly into cavity 18. From FIG. 1 it can be seen that when a contact pin is fully inserted in the module, it slightly distorts the conductive elastomer bus pad 40 under pressure extending axially of said pin assuring good electrical contact with the bus pad over the entire area of contacting surface 50.

As noted above, one potential problem with existing termination modules is that an electrical circuit is completed as soon as the contact and bus bar touch or come near touching each other, resulting in arcing and potential burn-outs. If a conductive elastomer or elastomeric material, such as Pressex, which is conductive only when compressed is utilized for the bus pad 40, the problem described above can be eliminated. With such a conductive elastomer, the pad is an insulator until sufficient pressure is applied to it by the contact pin to render it conductive. Thus, a complete circuit is established only when good physical and electrical contact exists over the entire contacting area 50 of the contact pin. The danger of arcing or burn-out when connecting live conductors is thus totally eliminated.

The circuits which are established with the module shown in FIG. 1 selectively interconnect the conductors or wires 44 through a bus pad 40 and may be altered in a number of ways. First, additional contact pins 42 may be inserted into the module to establish additional conductive circuits or, a suitable rear release tool may be inserted through openings 32 and 26 to bend back tines 28, which are operable for disengaging ridge 48 and permitting a contact pin 42 to be removed by pulling on its wire 44. Another manner of changing electrical connections is to removably mount housing 34 in body 12 as, for example, by screwing the housing in the body. With this configuration, connections may be altered by removing the bus moving and either placing bus pads in previously empty slot 36 or removing bus pads 40 from slots 36. It should, at this point, be noted that the arrangement of slots 36 shown in FIG. 2 is by way of example only and that the arrangement of these slots for a given module will vary with application.

Figure 3:
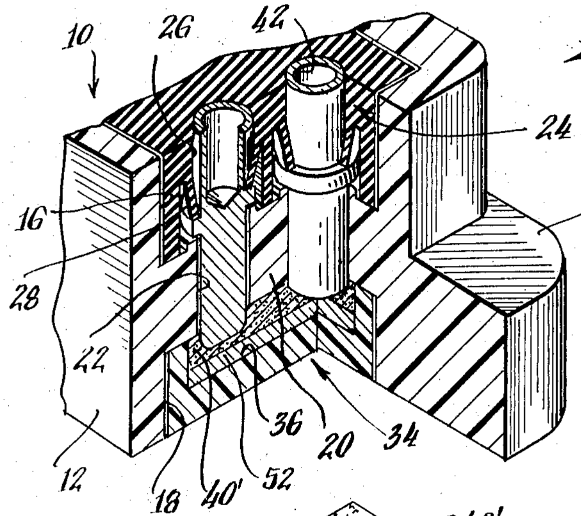
FIG. 3 is a cut-away perspective view of a portion of a termination module for an alternative embodiment of the invention.
Figure 5:
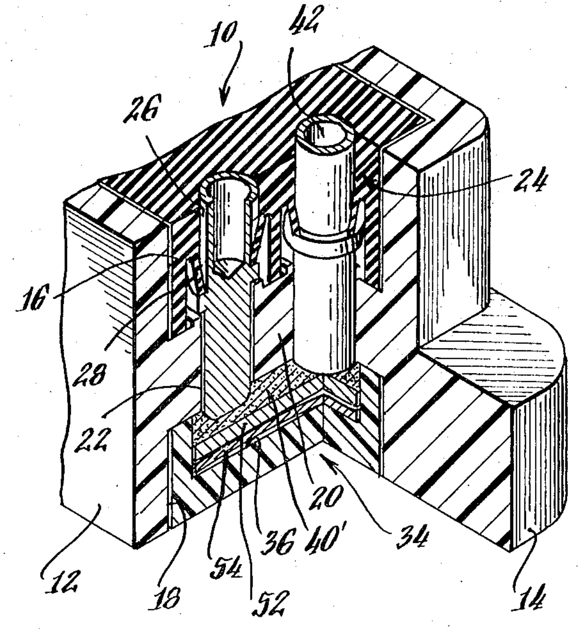
FIG. 5 is a partially cut-away perspective view of a portion of a termination module of a second alternative embodiment of the invention.
Figure 4:
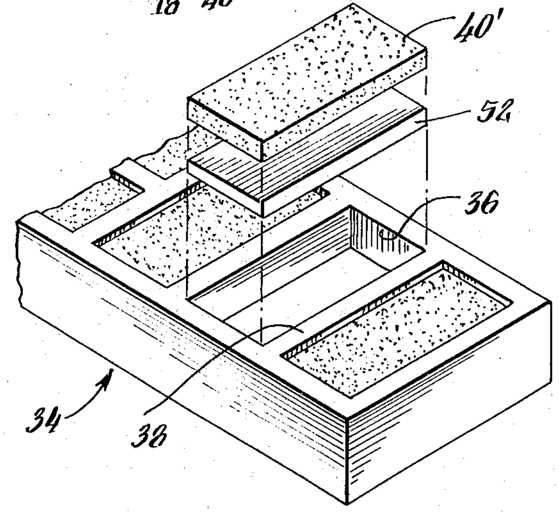
FIG. 4 is a partially exploded perspective view of a bus housing suitable for use with the embodiment of the invention shown in FIG. 3.

While the termination module shown in FIG. 1 reduces contact resistance by providing a wide contact area rather than minute point contact between the contact pin and the bus pad, the total resistance of the termination module is still relatively high because the conductor elastomer bus pad is only a relatively good conductor. FIGS. 3 and 4 show an embodiment of the invention which permits the advantages of utilizing a conductive elastomer bus pad to be realized while also achieving the advantages of a high conductivity copper bus bar. This advantage is achieved by utilizing a thinner conductive elastomer bus pad 40 then the bus pad 40 utilized with the embodiment of FIG. 1, and mounting a copper bus bar 52 under the bus pad 40′ in slot 36 so that the supporting means 34 includes means comprising the walls of slot 36 for mounting the bus bar 52 in intimate physical and electrical contact with the side of the bus pad opposite the side of the bus pad engaging with the contact pins, as seen in FIG. 5. The pressure applied to bus pad 40′ by pin contacts 42 assures good physical and electrical contact between pad 40′ and bar 52 over substantially their entire adjacent surface areas. The bus bar 52 provides a low resistance shunt path for electric current flow between a pair of conductors, for example, through a corresponding pair of contact pins 42 which path is in electrical parallel with the path provided by bus pad 40′. Current therefore flows from one of the conductors, 44, through its connected contact pin 42, the engaged bus pad and bus bar to another contact pin and conductor of the pair, as may be visualized from FIGS. 2, 3, 5, and 7. The combined resistance of the two pads is thus relatively low assuring minimal voltage drop, i.e., resistance induced losses, in the termination module.

Figure 6:
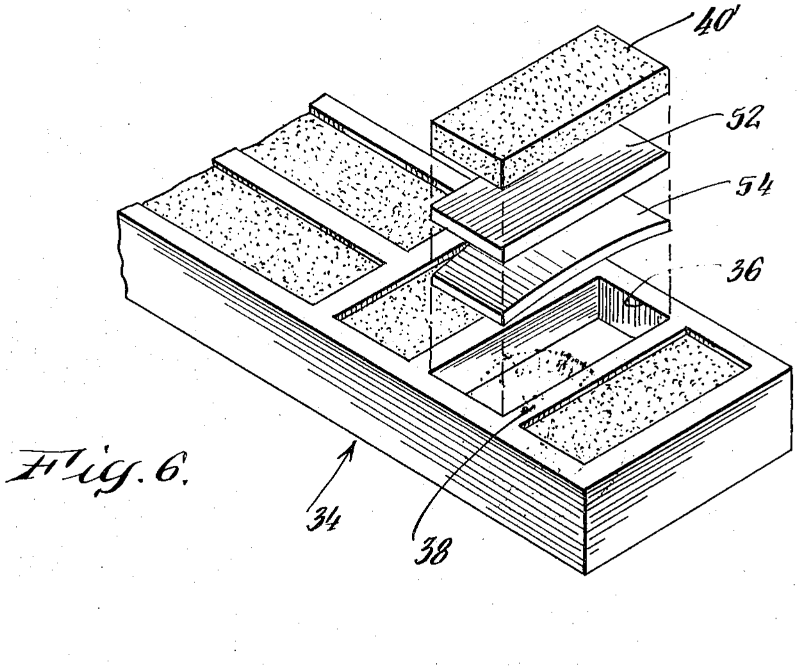
FIG. 6 is a partially exploded perspective view of a bus housing suitable for use with the embodiment of the invention shown in FIG. 5.

In the embodiment of the invention shown in FIGS. 3 and 4, the pressure of contact pin 42 on bus pad 45 is relied upon to assure good physical and electrical contact over the entire surface area between pad 40′ and bus bar 52. However, the contact pins apply pressure only at discrete points along the pad and thus may not assure good electrical contact over the entire surface area of the pad and bus bar. To assure such good physical and electrical contact over the entire surface area of the pad and bus bar, a pressure metal spring 54 is positioned under bus bar 52 in the embodiment of the invention shown in FIGS. 5 and 6. As may be seen from FIGS. 5 and 6, the contact housing also has means for supporting the pressure spring in engagement with the bus pad and/or bus bar to bias the bus bar and/or pad against the pin contacting surface. If pressure spring 54 is of a conductive metal, it may also function as a shunt conductor for the reducing the resistance presented by the module.

Figure 7:
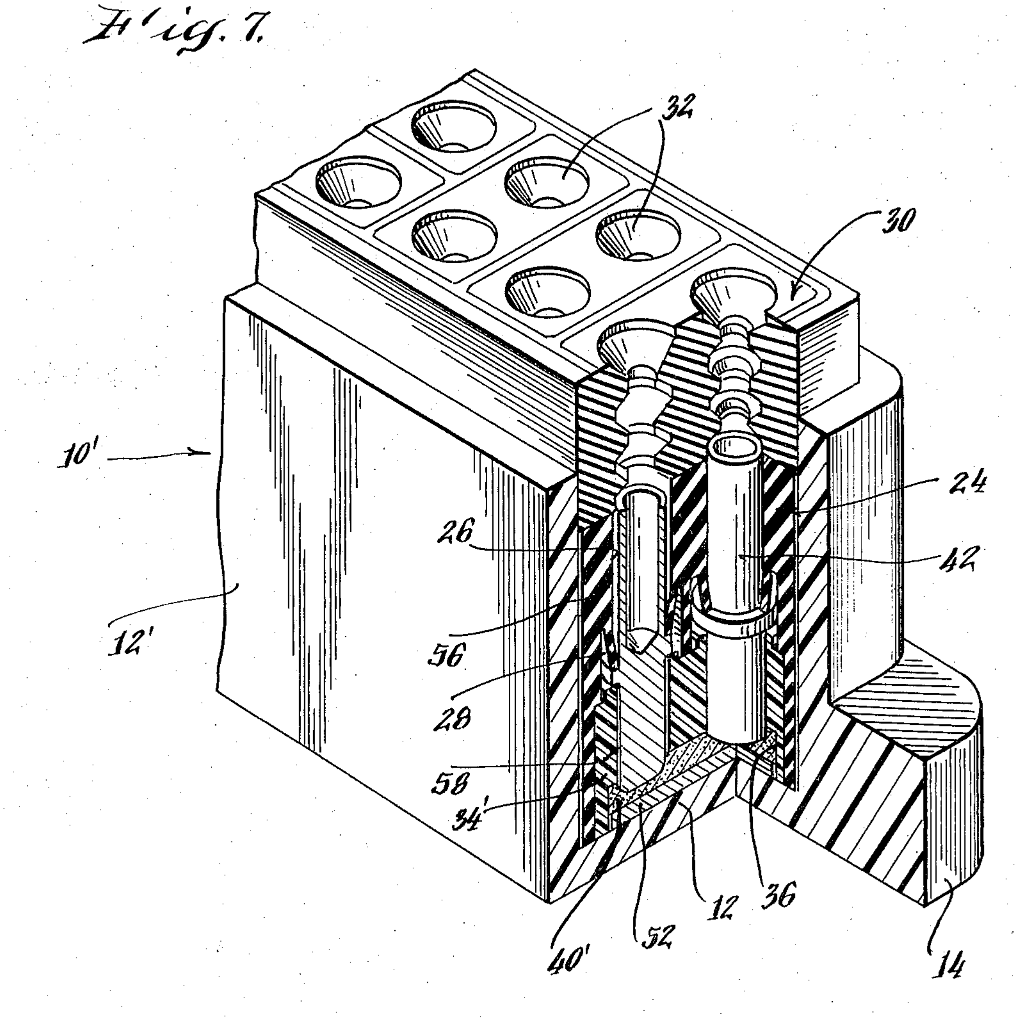
FIG. 7 is a partially cut-away perspective view of a portion of a termination module of a third alternative embodiment of the invention.

In the embodiments of the invention described above, an outer body 12 has been provided with an upper cavity 16 in which the contact housing is mounted and a lower cavity 18 in which the bus housing 34 is mounted. In FIG. 7, an alternative embodiment of the invention is shown in which the outer body 12′ has only a single cavity 56 in which is mounted a modified bus housing 34′, contact housing 24, and a portion of gasket 30. Bus housing 34' has openings 58 formed through it which openings are aligned with the openings 32 and 26 in grommet 30 and housing 24 respectively, and has slots 36' formed on its underside rather than on its top. Contact pins 42 are mounted to project through openings 58 into slots 36'. Bus pads 40 or 40' are mounted in slots 36' adjacent the hole-58-containing walls thereof. A bus bar 52, if it is provided, is mounted under pad 40' as shown in FIG. 7. The operation with respect to the embodiment of the invention shown in FIG. 7 is substantially identical to that described previously with respect to FIGS. 1 and 3 and the advantages achieved are the same.

While the invention has been particularly shown and described above with reference to preferred embodiments thereof, it will be apparent to those skilled in the art that the foregoing and other changes in form and details may be made therein without departing from the spirit and scope of the invention.

What is claimed is:

1. A termination module for selectively interconnecting a plurality of electrical conductors comprising:

- a contact housing having a plurality of adjacent contact pin receiving openings;
- a contact pin mounted in a corresponding opening for each of the electrical conductors, each contact pin arranged for electrical connection to a corresponding electrical conductor at one end, a contacting surface at the other end of each contact pin;
- a retaining element formed on each contact pin;
- a retaining element for each of the openings for engagement with the retaining element of the contact pin mounted in the respective opening to retain the pin in the opening;
- at least one bus pad of a conductive elastomer material and having opposite sides;
- means for supporting said bus pad with one side in intimate physical and electrical engagement with the contacting surfaces of at least two pins for completing an electrical circuit between the respective conductors;
- a bus bar of conductive metal for each conductive elastomer bus pad;
- said supporting means including means for mounting each bus bar in intimate physical and electrical contact with the side of said bus pad which is opposite said one side of said bus pad;
- a pressure spring for each bus pad; and
- means included in said supporting means for mounting said pressure spring adjacent said bus bar in a manner such as to bias said bus bar against said bus pad and to bias said bus pad against the contacting surfaces of said contact pins.

2. A termination module for interconnecting a pair of electrical conductors comprising:

- a body of electrically insulating material having a pair of spaced apart openings;
- a pair of contact pins each adapted to be connected at one end to a respective electrical conductor with each pin passing through a respective opening and having a contact surface end spaced longitudinally in one direction from one end of the respective opening;
- a bus pad of conductive elastomeric material for establishing an electrical connection between said pair of said pins in response to the engagement of the contact surface end of each pin of said pair of pins with said pad;
- means for retaining said bus pad spaced in said one direction from said openings;
- first retaining means integrally formed on each pin;
- second retaining means formed of electrically insulating material adjacent each opening and spaced for engagement with the first retaining means on the pin passing through the opening adjacent the second retaining means in response to the contact surface end of the pin passing through the opening engaging said pad under pressure to thereby retain the contact surface end of each pin engaged with said bus pad under sufficient pressure extending axially of each pin to compress said pad and establish said electrical connection, each said second retaining means operable to disengage the first retaining means on the pin passing through the opening adjacent the second retaining means for enabling the contact pin passing through the adjacent opening to be retracted through the adjacent opening.

3. In the module claimed in claim 2 a metal bus bar positioned in engagement with said elastomeric bus pad under pressure to establish an electrical connection from one pin through said bus pad and bus bar to the other pin of said pair.

4. In the module claimed in claim 2 metal spring means external to said bus pad for biasing said bus pad toward the pin contact surface end engaged with said bus pad.

5. The module claimed in claim 2 in which said body has a wall located intermediate opposite ends of said body with said pin openings formed in said wall, said wall defining a cavity at each end of said body with one cavity receiving said second retaining means and the other cavity receiving said bus pad, said pin openings communicating one cavity with the other cavity, and a sealing grommet secured in said one cavity for sealing the one end of each pin connected to an electrical conductor.

6. The module claimed in claim 5 in which said first retaining means includes a radially extending ridge on each pin for engaging said wall to limit the movement of the respective pin through each opening in said one direction, and said second retaining means comprises a pair of resilient tines engaging said ridge for holding the contact surface end of said respective pin engaged with said bus pad and adapted to be moved radially outwardly of said ridge to enable said respective pin to be disengaged from said bus pad.

* * * * *